(12) United States Patent
Regan et al.

(10) Patent No.: US 9,738,396 B2
(45) Date of Patent: Aug. 22, 2017

(54) VEHICLE OCCUPANT SENSOR SYSTEM AND METHOD

(71) Applicant: The Boeing Company, Chicago, IL (US)

(72) Inventors: Casey Charles Regan, Snohomish, WA (US); Stephen William Ayres, Belgrade, MT (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/853,372

(22) Filed: Sep. 14, 2015

(65) Prior Publication Data

US 2017/0073081 A1   Mar. 16, 2017

(51) Int. Cl.
| | | |
|---|---|---|
| B64D 11/00 | (2006.01) | |
| B60R 7/00 | (2006.01) | |
| B64D 45/00 | (2006.01) | |
| B64D 9/00 | (2006.01) | |
| G01M 1/12 | (2006.01) | |
| B64D 11/06 | (2006.01) | |
| B64F 5/00 | (2017.01) | |

(52) U.S. Cl.
CPC .............. *B64D 45/00* (2013.01); *B64D 9/00* (2013.01); *B64D 11/00* (2013.01); *B64D 11/06* (2013.01); *G01M 1/125* (2013.01)

(58) Field of Classification Search
CPC .............. B64D 11/00; B60R 7/00; B64F 5/00
USPC ........................................................ 701/124
See application file for complete search history.

(56) References Cited

U.S. PATENT DOCUMENTS

| 3,746,844 A | | 7/1973 | Azum et al. | |
|---|---|---|---|---|
| 4,225,926 A | * | 9/1980 | Wendt ...................... | B64D 9/00 |
| | | | | 177/136 |
| 4,935,885 A | * | 6/1990 | McHale ................. | G01G 19/02 |
| | | | | 177/199 |
| 6,227,489 B1 | | 5/2001 | Kitamoto et al. | |

(Continued)

FOREIGN PATENT DOCUMENTS

| EP | 2 730 479 | 5/2014 |
|---|---|---|
| EP | 2 910 471 | 8/2015 |
| WO | 2015/130572 | 9/2015 |

OTHER PUBLICATIONS

Flamina Del Conte et al., "Flight Beat", http://www.flaminiadelconte.com/#!flightbeat/c12ng, Flaminiadc/Flightbeat, KLM, pp. 1-4 (2014).

(Continued)

*Primary Examiner* — Tan Q Nguyen
(74) *Attorney, Agent, or Firm* — Thompson Hine LLP

(57) ABSTRACT

A vehicle occupant sensor system for determining an occupant load distribution in a vehicle having a plurality of passenger seats may include a plurality of sensors, each of the plurality of sensors associated with a different one of the plurality of passenger seats for detecting an occupant in each of the plurality of passenger seats, and a weight of the detected occupant; and a computer connected to receive data from each of the plurality of sensors indicative of the weight and passenger seat location in the vehicle of the detected occupant in each of the plurality of passenger seats, and calculate from the data a total weight and center of gravity of the detected occupants in the plurality of passenger seats.

20 Claims, 3 Drawing Sheets

(56) References Cited

U.S. PATENT DOCUMENTS

| | | | |
|---|---|---|---|
| 6,308,131 B1 * | 10/2001 | Fox | B64D 9/00 |
| | | | 177/136 |
| 8,195,327 B2 * | 6/2012 | Krantz | B64C 1/20 |
| | | | 198/782 |
| 2010/0044515 A1 * | 2/2010 | Neto | G01M 1/127 |
| | | | 244/135 C |
| 2015/0008709 A1 * | 1/2015 | Erhel | B64D 11/0636 |
| | | | 297/217.2 |
| 2016/0121765 A1 * | 5/2016 | Desjardins | B60N 2/42 |
| | | | 701/49 |

OTHER PUBLICATIONS

EP, Extended European Search Report; Patent Application No. 16177646.3, 8 pages (Jan. 18, 2017).

* cited by examiner

VEHICLE OCCUPANT SENSOR SYSTEM AND METHOD

TECHNICAL FIELD

The present disclosure relates to systems and methods for detecting and calculating the internal load distribution in vehicles and, more particularly, to systems and methods for detecting and calculating the internal load distribution of occupants in an aircraft.

BACKGROUND

In passenger aircraft, it is necessary to detect the weight of each occupant in the vehicle to determine the total weight and balance distribution of the occupants. This is particularly important in aircraft, such as commercial passenger aircraft, where the combined weight of the occupants can exceed 50 tons. The distribution of passengers and the weight of the individual passengers so distributed must be calculated to determine the center of gravity of the occupants. The center of gravity, once determined, is entered into the flight management computer (FMC) of the aircraft by the flight crew. The FMC then calculates the required elevator trim and performance settings for aircraft takeoff.

It also may be necessary to calculate the occupant center of gravity on an ongoing basis during passenger loading and unloading to ensure that the center of gravity does not shift beyond a predetermined aft limit of the aircraft to a point that may create an imbalance in the weight distribution of the aircraft. This is especially important during passenger loading and unloading when baggage is being loaded and unloaded at the same time.

Currently, the center of gravity of the occupants can be calculated by flight attendants, who perform a count of passengers seated on the aircraft. The flight attendants walk through the cabin and manually count the number of adults and children in every zone. This count of adults and children is converted to a rough passenger weight per predetermined location or zone, which is calculated and then entered into the flight management computer by the flight crew. Such a manual process can be inaccurate, and is time consuming, which can delay the turnaround time of the aircraft. Accordingly, there is a need for a system and method for rapidly and accurately calculating the passenger center of gravity of an aircraft.

SUMMARY

The present disclosure is a vehicle occupant sensor system and method that rapidly and accurately calculates the occupant center of gravity in a vehicle such as an aircraft. In one aspect, a vehicle occupant sensor system for determining an occupant load distribution in a vehicle having a plurality of passenger seats may include a plurality of sensors, each of the plurality of sensors associated with a different one of the plurality of passenger seats for detecting an occupant in each of the plurality of passenger seats, and a weight of the detected occupant; and a computer connected to receive data from each of the plurality of sensors indicative of the weight and passenger seat location in the vehicle of the detected occupant in each of the plurality of passenger seats, and calculate from the data a total weight of and center of gravity of the detected occupants in the plurality of passenger seats.

In another aspect, an aircraft having a passenger cabin with a plurality of passenger seats and an occupant sensor system for determining an occupant load distribution may include a sensor system having a plurality of sensors, each of the plurality of sensors associated with a different one of the plurality of passenger seats for sensing the weight of an occupant in each of the plurality of passenger seats; and a computer connected to receive data from each of the plurality of sensors indicative of the weight and passenger seat location in the vehicle of the occupant at each of the plurality of passenger seats, and calculate from the data a center of gravity of the occupants of the plurality of passenger seats relative to the passenger cabin.

In yet another aspect, a method for determining an occupant load distribution in a vehicle having a plurality of passenger seats may include detecting a presence of an occupant in each of the plurality of passenger seats, and sensing a weight of each occupant; transmitting data indicative of the detected presence of the occupant in each of the plurality of passenger seats, the sensed weight of each of the occupants, and passenger seat location of the vehicle of each of the occupants of each of the plurality of passenger seats; and calculating from the data a center of gravity of the occupants of the plurality of passenger seats relative to the vehicle.

Other objects and advantages of the disclosed vehicle occupant sensor system and method will be apparent from the following description, the accompanying drawings, and the appended claims.

DETAILED DESCRIPTION

Figure 1:
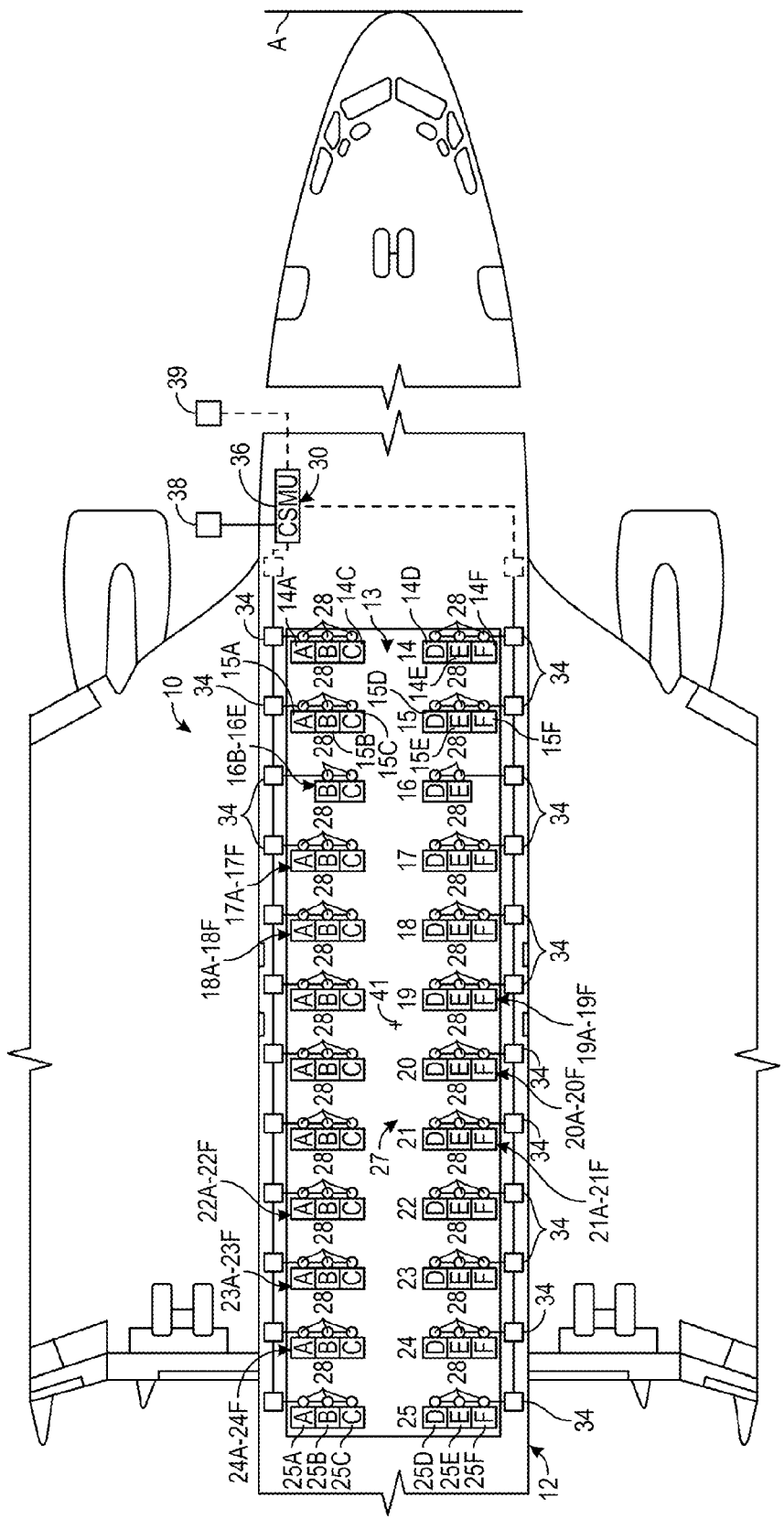
FIG. 1 is a schematic top plan view of a passenger vehicle in the form of an aircraft, having one aspect of the disclosed vehicle occupant sensor system.

As shown in FIG. 1, an aspect of the vehicle occupant sensor system for determining an occupant load distribution, generally designated 10, may be incorporated in a vehicle such as an aircraft, and in particular a commercial passenger aircraft 12. The aircraft 12 may include a passenger cabin 13 having a plurality of passenger seats 14A-14F, 15A-15F, 16B-16E, 17A-17F, 18A-18F, 19A-19F, 20A-20F, 21A-21F, 22A-22F, 23A-23F, 24A-24F, and 25A-25F. In other aspects, the aircraft 12 may have a greater number or a fewer number of passenger seats. Aircraft 12 also may have a greater number of aisles than shown. In the aircraft 12 shown, the passenger seats 14A-14F through 25A-25F may be grouped in rows of six seats across, in which an aisle 27 may separate each row of seats into groupings of three seats A-C and D-F (except for row 16, which may function as an exit row having seats 16B and 16C on one side of aisle 27, and 16D and 16E on the other side of the aisle.

The system 10 may include a plurality of sensors 28, in which each of the plurality of sensors is associated with a different one of the plurality of passenger seats 14A-25F for detecting an occupant or passenger (the terms "occupant" and "passenger" being used herein interchangeably) in each of the plurality of passenger seats, and a weight of the detected occupant. The sensors 28 may be load sensors. The sensors 28 may be connected to a computer, generally designated 30, that may receive data from each of the plurality of sensors indicative of the weight and passenger seat location in the vehicle 12 of the detected occupant in each of the plurality of passenger seats. As will be described in greater detail, the computer 30 may calculate from that data the total weight and the center of gravity of the detected occupants in the plurality of passenger seats 28.

In an embodiment, the computer 30 may activate a visual and/or audio alarm if a center of gravity 41 of the passengers shifts beyond a predetermined location in the aircraft 12. Also in an embodiment, the computer 30 may activate a visual and/or audio alarm when the center of gravity 41 shifts aft of the aircraft beyond a predetermined distance from a reference plane A. Also in an embodiment, the computer 30 may calculate the center of gravity 41 a plurality of times during one or both of occupant loading of the aircraft 12, and occupant unloading of the aircraft.

Figure 2:
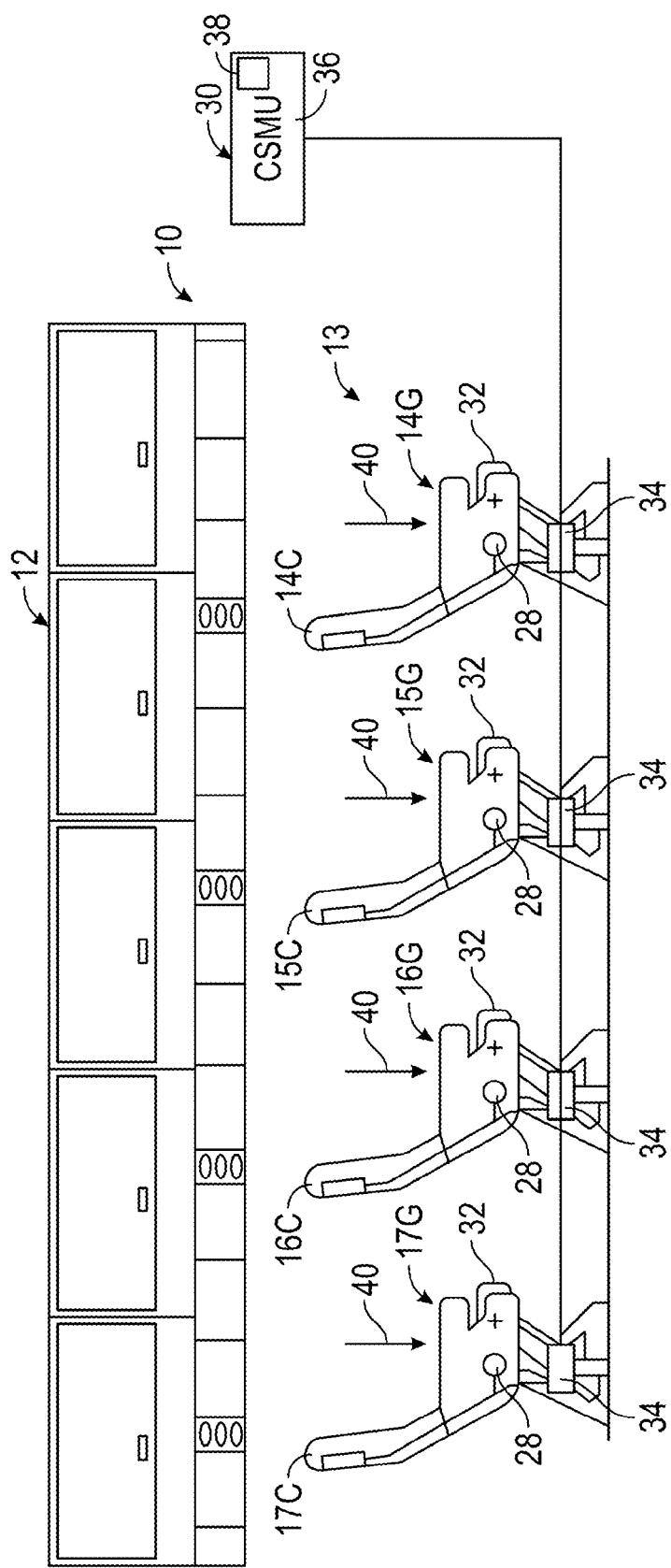
FIG. 2 is a side elevation of a portion of the passenger cabin of the aircraft of FIG. 1.

As shown in FIGS. 1 and 2, in an embodiment, each of the plurality of sensors 28 may be integrated into either a seat cushion or a seat bottom 32 of a different one of the plurality of passenger seats 14A-25F of the aircraft 12. Also in an embodiment, each of the plurality of sensors 28 may be connected to a seat electronics unit 34 located in a seat group 14G, 15G, 16G, 17G (FIG. 2) associated with the plurality of passenger seats 14A-25F. For example, seat group 14G may include seats 14A, 14B, and 14C, (FIG. 1), seat group 15G may include seats 15A, 15B, and 15C, seat group 16G may include seats 16A, 16B, and 16C, seat group 17G may include seats 17A, 17B, and 17C, and so on for some or all of the seats of the aircraft 12.

In an embodiment, the seat electronics units 34 of the seats 14A-25F may be connected to the computer 30. In an embodiment, the computer 30 may include a cabin system management unit 36 and a cabin system control panel 38. In the embodiment of FIGS. 1 and 2, existing seat-to-seat cables may provide the power and data wire for transmitting information from the sensors 28 to the cabin system management unit 36, which in an embodiment may be located at the front of the aircraft 12. The information received from the sensors 28 may be visually displayed on the cabin system control panel 38 for flight attendants to record and communicate to the flight crew. Alternatively, the system 10 may include a remote alarm 39, which may include a visual and/or audio alarm, that may alert baggage handlers if the center of gravity shifts aft of the aircraft 12 beyond a predetermined distance from a reference plane A. The remote alarm 39 may be located on the aircraft 12 in or near a baggage handling compartment, on a baggage-conveying vehicle that services the aircraft, and/or worn by baggage-handling personnel. The alarm 39 may be connected to receive an alarm signal from the computer 30 either by wire or wirelessly.

In an embodiment, each of the sensors 28 may be configured to transmit one of three signals. When the applied load from a passenger or occupant 40 (represented by heavy arrows in FIG. 2) is less than a first threshold, which in an embodiment may be 28 pounds (12.7 kg.), or one of the seats 14A-25F is unoccupied, the sensor 28 of that seat may transmit a first or "zero weight" signal to the cabin system management unit 36. Any load under the first threshold of 28 pounds will be considered negligible.

When the occupant load on one of the seats 14A-25F is above the first threshold, which may be 28 pounds, but less than a second threshold, which in an embodiment may be 100 pounds (45.5 kg.), the sensor 28 may transmit a second or in an embodiment an "87 pound weight" ("39.5 kg. weight") signal to the cabin system management unit 36. This range may capture the average weight of a male or female child from ages 2 to 13. The FAA (Federal Aviation Administration) standard average passenger weight of a child between 2 and 13 years of age is 87 pounds in winter and includes 10 pounds (4.5 kg.) for winter clothing and a 16 pound (7.3 kg.) allowance for personal items and carry-on bags. This standard is set forth in FAA AC 120-27E.

When the occupant load on one of the seats 14A-25F detected by the sensor 28 is above the second threshold, which in an embodiment may be greater than 100 pounds, the sensor transmits a third signal, which in an embodiment may be a "195 pound weight" ("88.6 kg. weight) signal to the cabin system management unit 36. A weight of 195 pounds is the FAA standard passenger weight of an average adult during winter months. This too may include a 10 pound allowance for winter clothing and a 16 pound allowance for personal items and carry-on bags. The average weight during winter months is more conservative than the summer months due to an assumed winter clothing allowance. Using these forces at every given seat location 14A-25F, additional software in the cabin system management unit 36 may calculate a total passenger center of gravity by calculating the moments produced by every passenger 40 and dividing by the total calculated passenger weight. This weight and center of gravity either may be displayed on the cabin system control panel 38 or transmitted directly to the FMC (Flight Management Computer) for calculating the total passenger/occupant weight and center of gravity 41. The system 10 may reduce airplane turnaround times while improving passenger weight and center of gravity determination accuracy. During unloading of the aircraft 12, the system 10 may provide a way to actively monitor passenger center of gravity movement, which may warn ground operations and flight teams in the event of a possible airplane weight imbalance.

Figure 4:
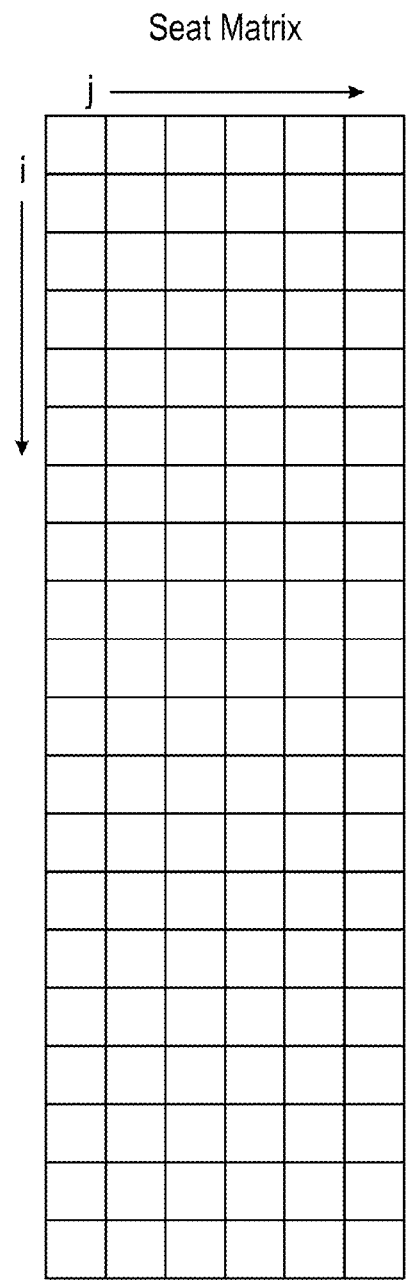
FIG. 4 is a representative seat matrix of a formula used to calculate a passenger center of gravity.

In an embodiment, the cabin system management unit 36 may calculate the center of gravity 41 (see FIG. 1) as follows. As shown in FIG. 4, the seats 14A-25F may be represented by a grid or matrix having j seats across and i rows of seats from front to back of the aircraft 12. The location of a seat $x_i$ row may be calculated using the following equation:

$$x_i = d + p(i-1)$$

where x is the moment arm of the $i^{th}$ row (in inches), d is the distance from the reference plane A to the seat location (in inches), and p is the seat pitch in inches. The total passenger weight may be calculated as follows:

$$w_{Total} = \sum_{i,j=1}^{n} w_{ij}$$

where $w_{ij}$ is the weight of a passenger transmitted by a sensor 28 at a seat at location i, j on the matrix of FIG. 4. Thus, the passenger/occupant center of gravity $CG_{PAX}$ may be calculated as follows:

$$CG_{PAX} = \frac{\sum_{i,j=1}^{n} (w_{ij} \cdot x_i)}{w_{Total}}$$

Figure 3:
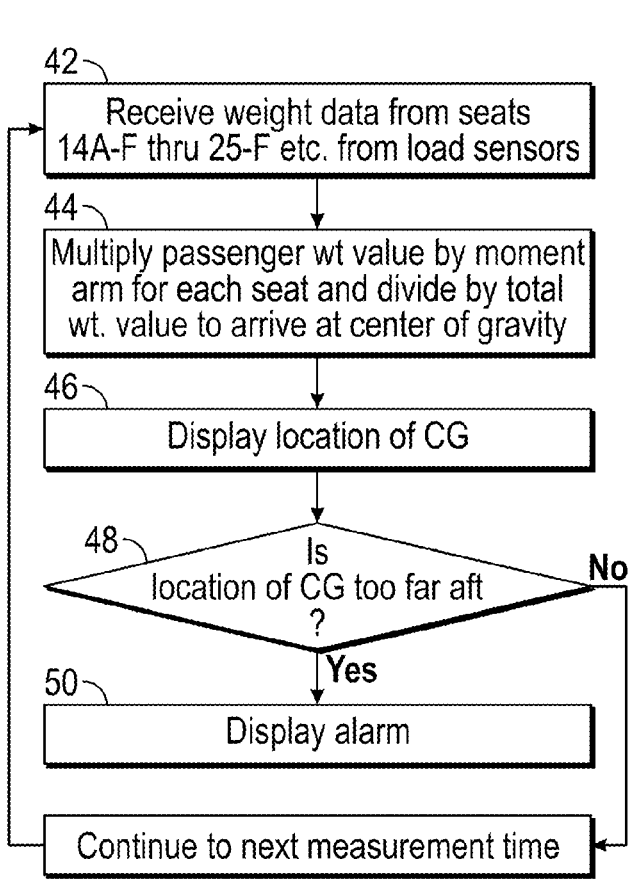
FIG. 3 is a flow chart of an aspect of the disclosed vehicle occupant sensor method.

As shown in FIG. 3, in an embodiment, the computer 30 may calculate the center of gravity 41 using the foregoing equations in the following process. As shown in block 42, the computer 30 (or cabin system management unit 36) may receive weight and seat location data from seats 14A-14F through 25A-25F (in embodiments, from some or all of the seats on the aircraft 12 in FIG. 1) from the load sensors 28 embedded in the cushions 32 of each seat (see FIG. 2). As shown in block 44, the weight data and position data from the load sensors 28 received by the cabin system management unit 36 of the computer 30 may be used by the computer to calculate an occupant center of gravity value by multiplying the passenger weight by the moment arm for each of the seats 14A-25F and dividing by the total weight value to arrive at a location of the center of gravity 41 of the occupants (FIG. 1) in the cabin 13 of the aircraft 12 as a distance from the reference plane A.

As shown in block 46, the location of the center of gravity 41 and total weight may be displayed on the cabin system control panel 38, which may be part of the computer 30 (FIG. 1). As shown in block 48, if the location of the center of gravity 41 of the occupants is too far aft of the reference plane A, an alarm may be displayed, as indicated by block 50. If an alarm is not displayed, the computer 30 may continue monitoring the location of the center of gravity 41 of the occupants in the cabin 13 of the aircraft 12 during a passenger loading and/or a passenger unloading procedure. In embodiments, the aforementioned computer routine may be performed automatically as the aircraft 12 is being loaded or unloaded, or may be prompted by a member of the flight crew.

In an embodiment, the sensors 28 may transmit a first signal if the weight of the occupant 40 in an associated one of the plurality of passenger seats 14A-25F is below 28 pounds, a second signal if the weight of the occupant of an associated one of the plurality of passenger seats is between 28 pounds and less than 100 pounds, and a third signal if the weight of the occupant of an associated one of the plurality of passenger seats is 100 pounds or greater. And, in embodiments discussed previously, the first signal may be transmitted as zero pounds, the second signal transmitted as 87 pounds, and the third signal transmitted as 195 pounds. Also in an embodiment, as indicated in block 50, the alarm 39 also may notify baggage handlers loading and/or unloading baggage from the aircraft 12 to stop loading or unloading cargo from the aircraft 12 if the computer 30 detects an airplane weight imbalance condition resulting from the location of the center of gravity 41 of the occupants.

The described vehicle occupant sensor system 10 and method provides advantages over manual systems. The method for calculating the center of gravity by utilizing sensors 28 embedded in each of the seats 14A-25F of an aircraft, is more accurate than manual estimations made by flight crew. The calculation of the center of gravity is more rapid and more precise than manual calculations. Further, the system 10 may provide alarms that are communicated to flight crew, and baggage handlers to avoid an undesirable imbalance in the aircraft center of gravity relative to a predetermined reference plane A, which may be at the nose of the aircraft 12.

While the foregoing systems and methods represent preferred systems and methods of detecting and calculating a center of gravity of the occupants in a vehicle such as an aircraft, it is to be understood that the scope of the disclosure and claims is not limited to these precise systems and methods, and that modifications may be made to the described systems and methods without departing from the scope of the disclosure and claims.

What is claimed is:

1. A vehicle occupant sensor system for determining an occupant load distribution in a vehicle having a plurality of passenger seats, the sensor system comprising:
   a plurality of sensors, each of the plurality of sensors mounted in a different one of the plurality of passenger seats for detecting a presence of an occupant in each of the plurality of passenger seats, and a weight of the detected occupant; and
   a computer connected to receive data from each of the plurality of sensors indicative of the weight of the detected occupant and a passenger seat location in the vehicle of the detected occupant in each of the plurality of passenger seats, and is programmed to calculate from the data a total weight of and a center of gravity of the detected occupants in the plurality of passenger seats;
   wherein the computer is programmed to calculate the center of gravity a plurality of times during one or both of occupant loading of the vehicle and occupant unloading of the vehicle.

2. The system of claim 1, wherein the computer displays an alarm if the center of gravity shifts beyond a predetermined location on the vehicle.

3. The system of claim 2, wherein the computer displays an alarm when the center of gravity shifts aft on the vehicle beyond a predetermined distance from a reference plane.

4. The system of claim 1, further comprising a remote alarm that includes a visual and/or audio alarm, that alerts baggage handlers if the center of gravity shifts aft of the vehicle beyond a predetermined distance from a reference plane.

5. The system of claim 1, wherein each of the plurality of sensors is integrated into a selected one of a seat cushion and a seat bottom of the different one of the plurality of passenger seats.

6. The system of claim 5, wherein each of the plurality of sensors is connected to a seat electronics unit located in a seat group associated with the different one of the plurality of passenger seats.

7. The system of claim 1, wherein the computer is a cabin system management unit.

8. The system of claim 1, wherein the computer is connected to a cabin system control panel, and wherein the computer displays information corresponding to a combined weight of the occupants and the center of gravity of the occupants of the vehicle.

9. The system of claim 1, wherein each of the plurality of sensors transmits a first signal to the computer if the weight of the occupant of an associated one of the plurality of passenger seats is less than a first threshold, a second signal to the computer if the weight of the occupant of an associated one of the plurality of passenger seats is less than the first threshold and less than a second threshold, and a third signal to the computer if the weight of the occupant of an associated one of the plurality of passenger seats is greater than the second threshold.

10. The system of claim 9, wherein the first signal is indicative of a first passenger weight range, the second signal is indicative of a second passenger weight range, and the third signal is indicative of a third passenger weight range.

11. The system of claim 10, wherein the first signal is 0 pounds, the second signal is 87 pounds (39.5 kg.), and the third signal is 195 pounds (88.6 kg.).

12. The system of claim 1, wherein the plurality of sensors includes load sensors.

13. An aircraft having a passenger cabin with a plurality of passenger seats and an occupant sensor system for determining an occupant load distribution, the sensor system comprising:
- a plurality of sensors, each of the plurality of sensors mounted in a different one of the plurality of passenger seats for sensing a weight of an occupant of each of the plurality of passenger seats; and
- a computer connected to receive data from each of the plurality of sensors indicative of the weight and a passenger seat location in the vehicle of the occupant of each of the plurality of passenger seats, and is programmed calculate from the data a center of gravity of the occupants of the plurality of passenger seats relative to the passenger cabin;
- wherein the computer is programmed to calculate the center of gravity a plurality of times during one or both of occupant loading of the vehicle and occupant unloading of the vehicle.

14. The aircraft of claim 13, wherein the computer displays a total passenger weight and the center of gravity to a flight crew of the aircraft.

15. The aircraft of claim 14, wherein the computer notifies one or both of baggage handlers to stop unloading cargo from the aircraft, and the flight crew to stop unloading passengers from the aircraft if the computer detects an airplane weight imbalance condition resulting from the location of the center of gravity.

16. A method for determining an occupant load distribution in a vehicle having a plurality of passenger seats, the method comprising:
- detecting a presence of an occupant of each of the plurality of passenger seats, and sensing a weight of each occupant with a plurality of sensors, in which each of the plurality of sensors is mounted in a different one of the plurality of passenger seats;
- transmitting by the plurality of sensors to a computer data indicative of the detected presence of the occupant of each of the plurality of passenger seats, the sensed weight of each of the occupants, and passenger seat location in the vehicle of each of the occupants of each of the plurality of passenger seats; and
- calculating from the data a plurality of times during one or both of occupant loading of the vehicle and occupant unloading of the vehicle a center of gravity of the occupants of the plurality of passenger seats relative to the vehicle by the computer.

17. The method of claim 16, further comprising placing a sensor in each of the plurality of passenger seats, the sensor detecting the presence and the weight of the occupant in each of the plurality of passenger seats and transmitting the data.

18. The method of claim 16, further comprising displaying an alarm if the center of gravity is beyond a predetermined location on the vehicle.

19. The method of claim 16, further comprising transmitting a first signal if the weight of the occupant of an associated one of the plurality of passenger seats is below a first threshold, a second signal if the weight of the occupant of an associated one of the plurality of passenger seats is between the first threshold and less than a second threshold, and a third signal if the weight of the occupant of an associated one of the plurality of passenger seats is greater than the second threshold.

20. The method of claim 19, further comprising transmitting the first signal as 0 pounds, the second signal as 87 pounds (39.5 kg.), and the third signal as 195 pounds (88.6 kg.).

* * * * *